2,973,229
BEARING UNITS FOR SPINDLES OF SPINNING AND TWISTING FRAMES

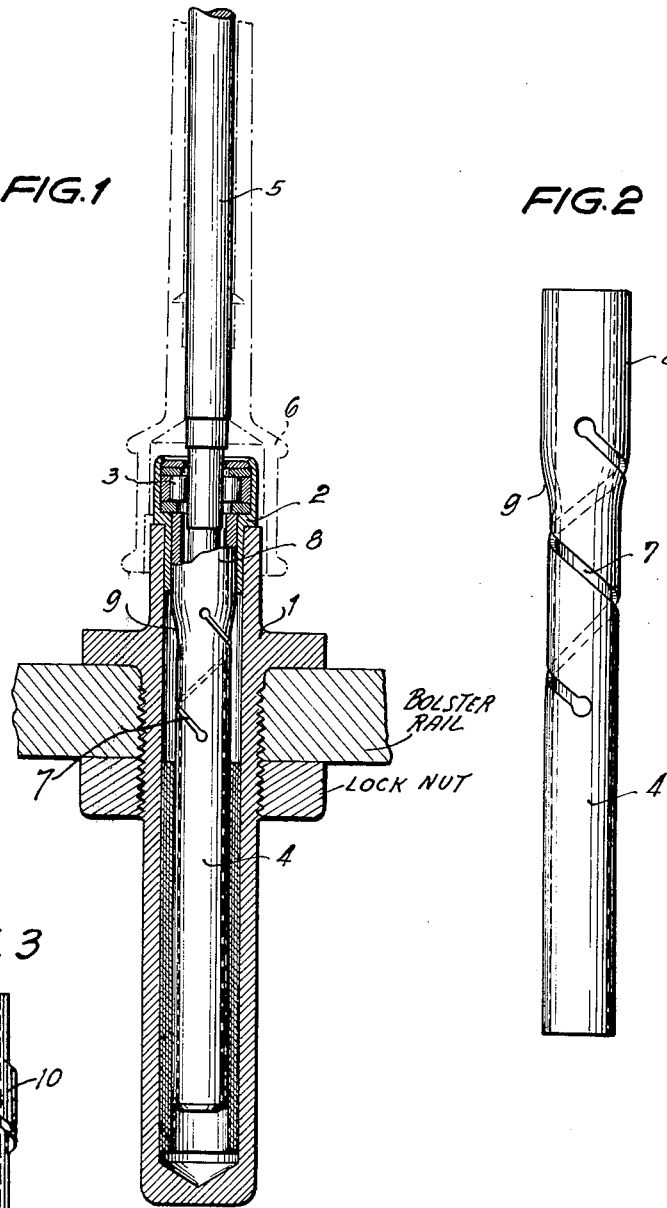
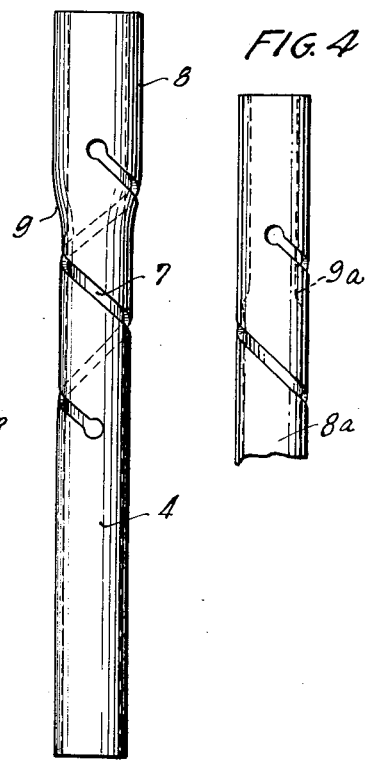
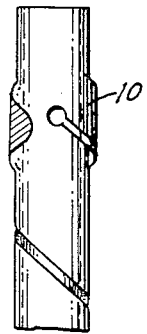

Ernst Rogner, Stuttgart-Bad Cannstatt, Wurttemberg, Germany, assignor to SKF Kugellagerfabriken Gesellschaft mit beschrankter Haftung, Schweinfurt, Germany, a company of Germany Filed Jan. 15, 1958, Ser. No. 709,104

Claims priority, application Germany Jan. 23, 1957

7 Claims. (Cl. 308—152)

This invention relates to bearing units for spindles of spinning and twisting frames.

One object of my invention is to improve such bearing units.

The bearing units for spindles of spinning and twisting frames, the present invention relates to, comprise neck and footstep bearings for the spindle blade which is inserted in a centering sleeve which, in turn, is fitted in a spindle bolster. The neck bearing is of the roller bearing type and is rigidly supported at least indirectly by the spindle bolster. The centering sleeve extends lengthwise within the spindle bolster and is rigidly held near the neck bearing at least indirectly by the spindle bolster. At its lower end, the centering sleeve receives the footstep bearing. The centering sleeve is provided with incisions in staggered or helical formation to be given elastic flexibility. Damping means are interposed between the spindle bolster and the centering sleeve for centering purposes and to improve the ability of the bearing units to absorb oscillations to such a degree that an unusually large unbalance can be controlled even at high spindle speeds. With bearing units of this type, which have very satisfactory running properties, the spindle can be run at a speed even beyond the critical speed almost silently and without whirring.

The primary object of my invention is to provide, for bearing units of the referred to type, a centering sleeve, the rigidity of which can be varied as may be desired, particularly in longitudinal direction, without substantially effecting the rigidity in the transverse direction.

Other objects of my present invention will become apparent hereinafter.

I have found that it is an advantage if the centering sleeve is made of a somewhat stronger construction in its upper portion. Such advantage is ensured according to my invention by giving the centering sleeve different wall thicknesses. Bearing units of the type described hereinbefore are in this way greatly improved. The centering sleeve is thus constituted by portions of different wall thicknesses, whereby the portion having the greatest wall thickness is provided where the end of the incision, on the side of the neck bearing, is located, regardless of the form the incision or incisions may have. I provide at least a single portion of a wall thickness greater than that of the remainder of the centering sleeve.

The extent of the reinforcement or additional thickness and the area over which the centering sleeve is reinforced may be adapted to the particular operating conditions, but when the centering sleeve is exposed to heavy thrust loads it is particularly advantageous to arrange that the upper end portion of the centering sleeve, that is to say, the portion adjacent to the neck bearing, has a greater thickness of wall than the remaining portion. In addition, this formation facilitates the insertion of the sleeve into the spindle bolster and it is not easily affected by lateral blows.

The transition from a portion of greater wall thickness to a portion of lesser wall thickness is preferably of curved formation.

The centering sleeve of my invention is ordinarily constituted by a single portion of greater wall thickness, a single portion of lesser wall thickness and a single transitional portion between the first named two portions.

With the upper end portion of the centering sleeve having a greater wall thickness, I have found it advisable to take the transitional portion over substantially the upper quarter of the incisions, so that the wall thickness in the center region will be the same as that of the lower portion of the centering sleeve. This gives the portion of the centering sleeve, which is operative as far as transverse movements are concerned, the same wall thickness as has the lower portion of the centering sleeve, and thus ensures a state of being readily movable. Any swinging motions of the centering sleeve decrease toward the top of the sleeve as the wall thickness increases, and assume the minimum at the place where the sleeve is rigidly held.

The specification is accompanied by a drawing in which:

Fig. 1 is an elevation of a bearing unit embodying features of my invention, partially sectioned;

Fig. 2 is an elevation of the centering sleeve shown in Fig. 1, drawn to a somewhat larger scale;

Fig. 3 is a fragmentary partially sectioned elevation of a modification of the centering sleeve shown in Figs. 1 and 2; and Fig. 4 shows another modification of a centering sleeve.

Referring to the drawing in greater detail and initially to Figs. 1 and 2, mounted in the upper portion of a spindle bolster 1 is an insert 2 which supports an antifriction roller bearing 3. A centering sleeve 4 is pressed into the insert 2 and receives at its lower end a footstep bearing (not shown) for the foot end of the spindle blade 5. The upper portion of the spindle blade 5 carries, in known manner, a driving member 6 indicated in dash-dotted lines. The centering sleeve is provided with a helically extending incision 7 and has, at the end on the side of the roller or neck bearing 3, a greater wall thickness than the remaining portions. The thicker portion 8 of the centering sleeve extends, when viewed in downward direction, beyond the upper end of the incision 7. The transitional portion 9 of the centering sleeve between the thicker portion 8 and the remainder of the sleeve is curved on its outside. From both Fig. 1 and Fig. 2 it will be seen that the internal diameter of the centering sleeve is uniform throughout the whole length of the latter. In the construction selected for illustration in Figs. 1 and 2, it is the external diameter of the transitional portion, which decreases in downward direction.

Referring to Fig. 4, it is within the scope of the invention to provide a centering sleeve 8a, the transitional portion 9a of which is interiorly curved, in which case the internal diameter increases in downward direction, whereas the external diameter is the same over the entire length of the sleeve.

In accordance with my invention, satisfactory results are also obtained when the greater wall thickness of the centering sleeve is restricted just to a length of the sleeve, in which the upper end of the incision is situated.

Further, it is within the purview of my invention to thicken the marginal zones only of the incision.

According to another feature of the invention, I do away with transitional portions and provide collarlike portions of greater wall thickness, as shown in Fig. 3. The collar is designated 10.

In the case of such collarlike portions, instead of being integral with the rest of the centering sleeve, they may be separately manufactured and rigidly connected to the centering sleeve in any desired manner.

It is believed that the construction and operation of the various forms of the bearing unit of my invention, as described hereinafter and partly illustrated in the drawing, will be fully understood. My new bearing unit offers the advantage that, with the possibility of lateral deflections of the centering sleeve within the limits of resilient deformation remaining the same, there is the added possibility of heavily loading the footstep bearing in the centering sleeve.

It will be apparent that while I have shown and described my invention in one form only, many changes and modifications may be made without departing from the spirit of the invention.

What is claimed is:

1. Bearing unit for spindles of spinning and twisting frames, comprising a spindle bolster having an upper and a lower end and being secured in a bolster rail, a neck bearing of the roller bearing type, rigidly supported at least indirectly by the spindle bolster near the upper end of the latter, a centering sleeve lengthwise extending within the spindle bolster and being rigidly held near the neck bearing at least indirectly by the spindle bolster, the centering sleeve having a lower and an upper portion, damping means provided between the spindle bolster and the lower portion of the centering sleeve, the lower portion of the centering sleeve being of uniform wall thickness, the upper portion of the centering sleeve being slotted and having a wall thickness which is at least partly greater than that of the lower portion of the centering sleeve.

2. Bearing unit for spindles of spinning and twisting frames, comprising a spindle bolster having an upper and a lower end and being secured in a bolster rail, a neck bearing of the roller bearing type, rigidly supported at least indirectly by the spindle bolster near the upper end of the latter, a centering sleeve lengthwise extending within the spindle bolster and having an upper and a lower end, said sleeve being rigidly held at the upper end thereof at least indirectly by the spindle bolster, a portion of the sleeve near said rigidly held upper end being provided with a slot extending between lengthwise spaced points, said portion having a greater wall thickness in the region of the upper end of the slot.

3. In the unit according to claim 2, the centering sleeve having throughout its length a uniform internal diameter.

4. In the unit according to claim 2, the centering sleeve having throughout its length a uniform external diameter.

5. In the unit according to claim 1, said upper portion having said greater wall thickness in the region of the upper end of the slot.

6. In the unit according to claim 2, said portion being of collarlike shape in the region of said greater wall thickness and the upper end of the slot.

7. In the unit according to claim 2, said portion having secured thereon a collar for said collarlike shape.

References Cited in the file of this patent

UNITED STATES PATENTS

| | | |
|---|---|---|
| 357,904 | Chapman | Feb. 15, 1887 |
| 1,203,309 | Chapman | Oct. 31, 1916 |
| 1,246,409 | Fjellman | Nov. 13, 1917 |
| 2,750,239 | Rogner et al. | June 12, 1956 |
| 2,757,992 | Schmid | Aug. 7, 1956 |

FOREIGN PATENTS

| | | |
|---|---|---|
| 557,952 | France | May 14, 1923 |